United States Patent [19]

Wildes et al.

[11] Patent Number: 5,363,758

[45] Date of Patent: Nov. 15, 1994

[54] BALER FOR POLYSTYRENE MATERIAL

[75] Inventors: Forrest Wildes; Wayne Maki, both of Baxley; Chris A. Jefferson, Hazlehurst, all of Ga.

[73] Assignee: Harris Waste Management Group, Inc., Minneapolis, Minn.

[21] Appl. No.: 831,430

[22] Filed: Feb. 8, 1992

[51] Int. Cl.⁵ .................... B30B 15/26; B30B 15/08
[52] U.S. Cl. ........................ 100/43; 100/97; 100/215; 100/249
[58] Field of Search ............. 100/3, 6, 35, 39, 41, 100/48, 50, 52, 94–97, 220, 249, 252, 43, 215

[56] References Cited

U.S. PATENT DOCUMENTS

| | | | |
|---|---|---|---|
| 3,557,685 | 1/1971 | Schroering | 100/39 |
| 3,625,138 | 12/1971 | Shinn et al. | 100/97 X |
| 3,651,755 | 3/1972 | Gati | 100/96 |
| 3,827,349 | 8/1974 | Gilman | 100/3 X |
| 3,929,062 | 12/1975 | Thompson | 100/3 |
| 3,992,986 | 11/1976 | Sutton | 100/220 X |
| 4,057,010 | 11/1977 | Smith | 100/50 |
| 4,099,457 | 7/1978 | Hyden | 100/41 X |
| 4,661,290 | 4/1987 | Sauda et al. | 100/41 X |
| 4,729,301 | 3/1988 | Smith et al. | 100/3 X |
| 4,961,375 | 10/1990 | Weder et al. | 100/215 X |

*Primary Examiner*—Stephen F. Gerrity
*Attorney, Agent, or Firm*—Kirkpatrick & Lockhart

[57] ABSTRACT

A baler for baling polystyrene material which has high bulk and low weight for subsequent recycling. The baler includes a ram which provides significant penetration over repeated cycles to compress the polystyrene into a bale, which is subsequently ejected through a bale door of the baler. The baler can either be manually controlled or automatically controlled, such as by an algorithm stored in programmable logic controller. Feedback systems measure the length of travel of the ram and the pressure of the ram determine the status of baling operation, and can automatically provide for ejection of the baled material. The bale can either be manually strapped, automatically strapped, and in some events, no strapping of the bale is required. The polystyrene material is chopped by a chopper system on the baler to break the material into smaller sections for baling. The baler has been specially designed to uniformly densify and bale most poly foam materials in a high production environment. The high pressure hydraulic system delivers powerful compaction force, enough to compress polystyrene foam past most material's form memory. The compression ram travels to the bale ejection door to deliver uniform material compaction from the first cycle to the bale's last. Other material can be baled by the baler.

2 Claims, 21 Drawing Sheets

Microfiche Appendix Included
(44 Microfiche, 1 Pages)

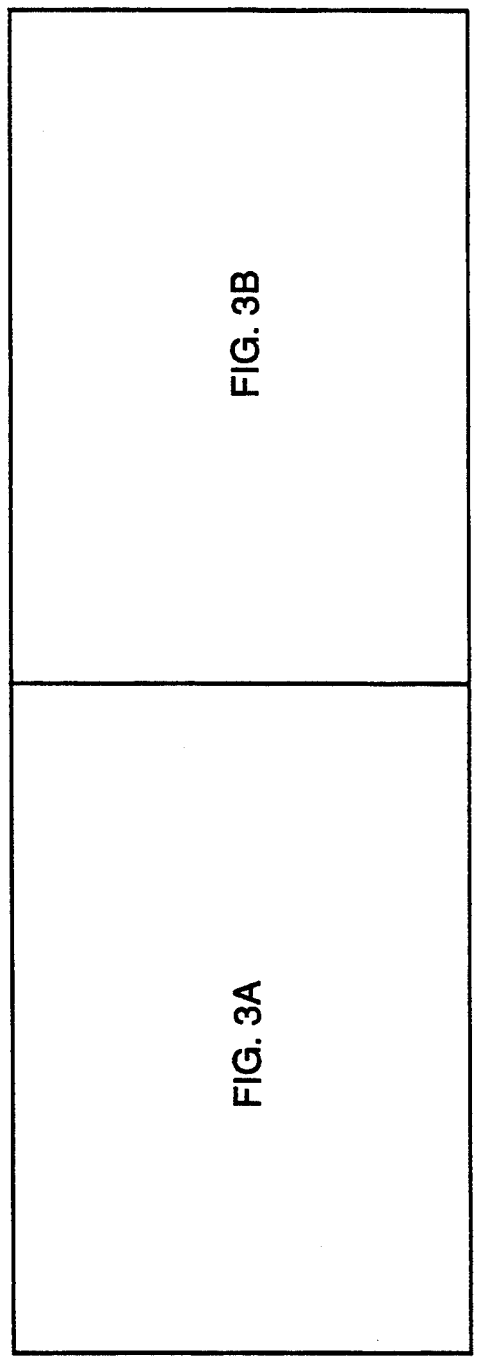

| ITEM | QTY | DESCRIPTION | PART # | INV. # |
|---|---|---|---|---|
| 1 | 1 | 50 HP 326TC MOTOR | CM4115T | D1-014 |
| 2 | 1 | 50 HP DOUBLE PUMP | 4525V50A211BB20282 | G5-045 |
| 3 | 1 | 50 HP MOTOR/PUMP CPL'G | MODEL 500 | H2-003 |
| 4 | 1 | 1 1/2" 4-BOLT UNLOADING VALVE | R5U-12 313-15-A1 | G4-023 |
| 5 | 1 | 1 1/2" 4-BOLT CHECK VALVE | C5V-12-321-A1 | G4-019 |
| 6 | 1 | 1" 4-BOLT RELIEF VALVE | R5V-08-313-12-A1 | G4-025 |
| 7 | 1 | 1" INLINE CHECK VALVE 65# | 3C15-8-65 | G4-007 |
| 8 | 1 | PRESSURE REDUCING VALVE | PBDB-FEN-ECA | G4-005 |
| 9 | 6 | PRESSURE GUAGE 0-3000 PSI | #7211-2 | GO-003 |
| 10 | 1 | PRESSURE TRANSDUCER | MOD K-1 | D5-010 |
| 11 | 1 | D06 SUBPLATE W/O RELIEF CART. | D08S016P | H1-001 |
| 12 | 1 | 3/4" DIRECTIONAL VALVE | DG5S8-8C-EWLB-20 | G4-087 |
| 13 | 3 | 3/8" FLOW CONTROL VALVE | F-600-S | G4-040 |
| 14 | 1 | D10 REGEN SUBPLATE | D-13674 | H1-004 |
| 15 | 1 | 1 1/4" DIRECTIONAL VALVE | DG5S4L-108C-E-W-B53 | G4-089 |
| 16 | 1 | 1 1/4" DIRECTIONAL VALVE | DG5S4L-106C-E-W-B53 | G4-086 |
| 17 | 1 | D02 SUBPLATE W/O RELIEF | D02 | H1-013 |
| 18 | 1 | VENT VALVE | DG4S4L-012A-WB-50 | G4-035 |
| 19 | 3 | 3" FILTER SUCTION STRAINER | SS-300-0 | G9-013 |
| 20 | 1 | 5 HP, 1750 RPM, 184TC MOTOR | 5 HP | D1-006 |
| 21 | 1 | 5 HP MOTOR/PUMP CPL'G | PM-90 1 1/8" X 7/8" | H2-004 |
| 22 | 1 | 5 HP COOLING PUMP | 25V-17A-1A20-282 | G5-025 |
| 23 | 1 | FLOW DIVIDER | 2V14-6-4-25S | |
| 24 | 1 | AIR TO OIL COOLER | AO-40 | G9-003 |
| 25 | 1 | 1 1/2" BACK PRESS CHECK VALVE | LRV15-50 | G4-083 |
| 26 | 1 | FILTER DOUBLE ELEMENT | RT2-KS7-PPY2 | G9-031 |
| 27 | 1 | FILTERED BREATHER | ABF 3/10 | G9-032 |
| 28 | 1 | FLOAT SWITCH | L6EPB-BS3A | GO-012 |
| 29 | 1 | TEMPERATURE SWITCH | FM437-153-3516 | GO-013 |
| 30 | 1 | SIGHT GUAGE | PDLOT-05 | GO-006 |
| 31 | 1 | HYDRAULIC TANK | 2R-50 HP | |

FIG. 12B

BALER FOR POLYSTYRENE MATERIAL

CROSS REFERENCE TO CO-PENDING APPLICATIONS

This application contains a microfiche appendix consisting of 1 fiche 44 frames.

BACKGROUND OF THE INVENTION

1. Field of the Invention

The present invention is for a baler, and more particularly, pertains to a baler for expanded or foamed polystyrene.

2. Description of the Prior Art

Prior art balers have not been practical for baling polystyrene, or poly foam because the ram did not have sufficient penetration through the baling chamber, and therefore, could not compress the material sufficiently. Therefore, high-volume and low-mass materials generally were very difficult to bale because of the lack of suitable ram penetration in the baling chamber. Bales made with prior art balers were unstable and tended to come apart even with careful handling.

Expanded polystyrene is a material of particular concern to environmentalists, as the material is of high volume and low mass, and is taking up considerable space in landfills. Polystyrene is used to package a wide assortment of products, such as washers, dryers, refrigerators, other household appliances, TVs, audiovisual equipment, model trains, and just about any other type of product which is shipped in a box. The packaging can range from small blocks measured in inches, to large shapes measured in feet. Polystyrene also comes in what is referred to as peanuts, spaghetti or denoted with other cute names, and is used as packing material to protect goods in boxes against damage in transit.

The wide diversity of sizes and shapes of polystyrene complicates the baling problem. Of course, it would be possible to sort polystyrene waste according to size and density, but this adds expense and complicates the salvage process.

The subsequent disposal of polystyrene is of very serious concern to the environmentalists, who in the past have had no real recourse but to see this type of packing material buried in landfills, wasting landfill space, which is now considered a precious, non-renewable natural resource.

The present invention overcomes the disadvantages of the prior art by providing a baling system for polystyrene packing material, where the bales of the polystyrene can then be recycled which saves, protects and preserves the environment.

SUMMARY OF THE INVENTION

The general purpose of the present invention is a baler for polystyrene material, having a ram with sufficient penetration in the baling chamber to provide for baling of material which had been impossible to bale satisfactorily.

According to one embodiment, there is provided a baler with a conveyor for elevating materials to a chopper, and a chopper above the baling chamber for chopping materials into smaller pieces. The baling chamber includes a ram having sufficient penetration to fully compress bale material against a bale door. The compression stroke is repeated until the pressure of the ram is at a predetermined level and the bale is at a predetermined bale length based on the length of travel of the ram. The bale's physical structure is referred to as a horizontal long box. The bale can be manually strapped.

Significant aspects and features of the present invention include a baler for baling of polystyrene packing material, which may vary from packing peanuts to large physical pieces which are used to pack appliances, such as washers, dryers, or refrigerators.

Another significant aspect and feature of the present invention is a baler which chops large-sized material of loose density, such as high-volume and low-density polystyrene.

A further significant aspect and feature of the present invention is a baler which bales material for subsequent recycling in an ecological manner while conserving energies and resources.

Additional significant aspects and features include the following:

Automatic bale sizing system. The baler's ram continuously builds each bale with a series of compression cycles. When the bale's determined length has been reached, sensors signal the ejection sequence.

Automatic baling cycle. This baler is equipped with a Harris controller, especially designed for the optimum baling efficiency of polystyrene foam materials. The operator can quickly select between several baling pressures to match system setting to the incoming material.

Poly foam hogger. Powerful rotary fingers rips and sizes incoming foam material for improved baling efficiency to provide a maximum dimension of 12". The unit mounts on top of the charge hopper.

Complete bale ejection from chamber. Each bale is completely ejected out of the chamber and free from the baler. Bale dimensions are uniform. Changing from one material to another is easy.

Bale ejection ready horn. When the baler has sensed a bale is ready for the ejection sequence, the compression cycle stops and a horn sounds to alert the operator to tie and eject the bale.

Other features include replaceable wear surface construction, ship channel frame design, four wire allot design for bale tie off, and breaker bar system.

Having thus described the embodiments of the present invention, it is a principal object hereof to provide a baler for baling materials.

One object of the present invention is to provide a baler with a chopper to chop polystyrene or other loose-density material prior to baling.

Another object of the present invention is to provide a baler with a ram with long penetration.

A further object of the present invention is a baler specially designed to uniformly densify and bale most poly foam materials in a high production environment. The high pressure hydraulic system delivers powerful compaction force, enough to compress polystyrene foam past the material's form memory. The compression ram travels to the bale ejection door to deliver uniform material compaction from the first cycle to the bale's last.

An additional object of the present invention is a baler to bale polystyrene material for subsequent recycling.

BRIEF DESCRIPTION OF THE DRAWINGS

Other objects of the present invention and many of the attendant advantages of the present invention will be readily appreciated as the same becomes better understood by reference to the following detailed description when considered in connection with the accompanying drawings, in which like reference numerals designate like parts throughout the figures thereof and wherein:

FIG. 2 illustrates the alignment of FIGS. 3A and 3B;

FIG. 9 illustrates the alignment of FIGS. 10A, 10B, and 10C;

DESCRIPTION OF THE PREFERRED EMBODIMENTS

Figure 1:
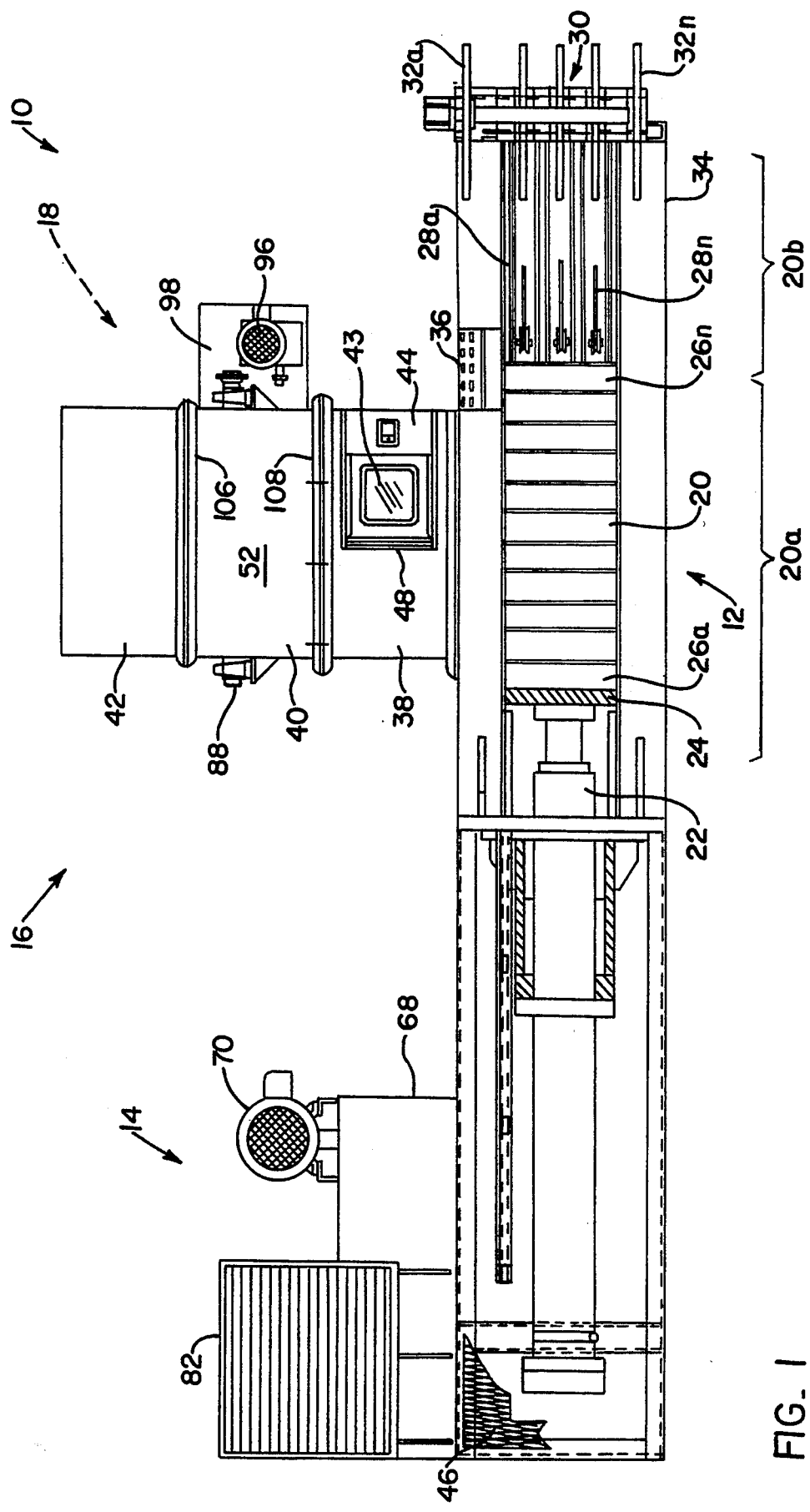
FIG. 1 illustrates a side view of the polystyrene baler.
Figure 3A:
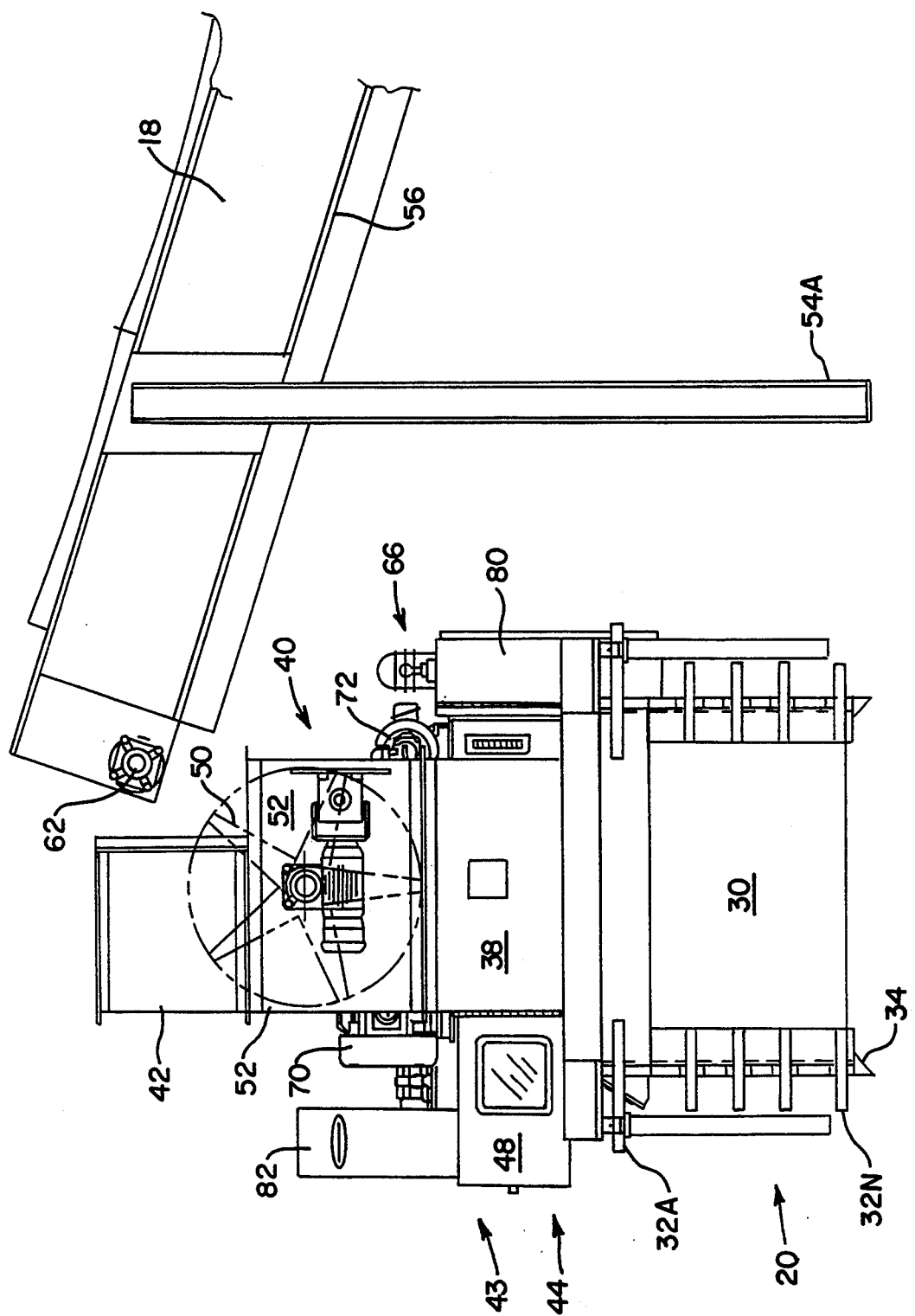
FIGS. 3A and 3B illustrate an end view of the polystyrene breaker.
Figure 3B:
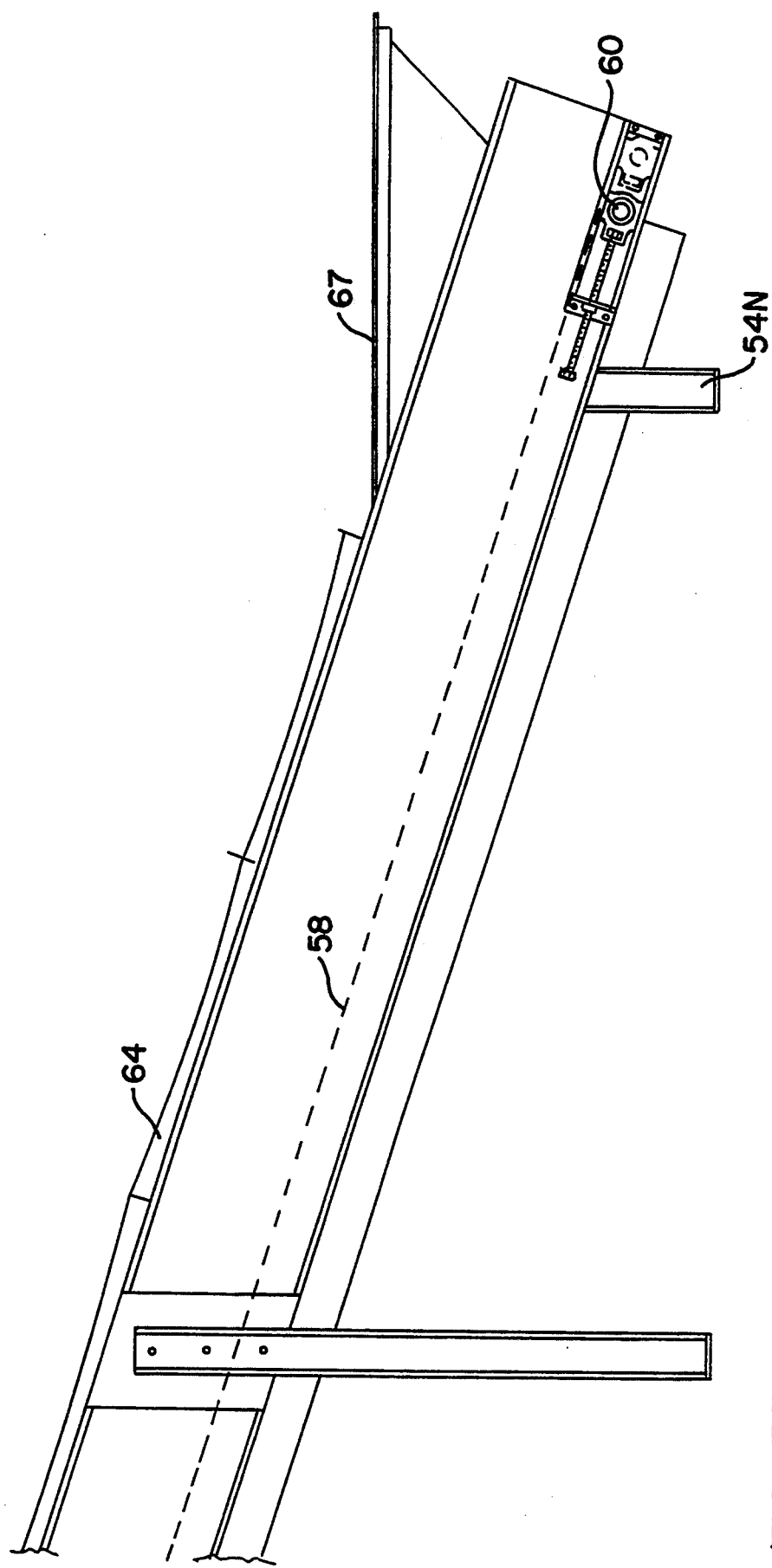

FIG. 1 illustrates a side view of a polystyrene baler 10, the present invention, generally including a baler 12, a hydraulic power unit 14, a loading area 16 and a conveyor 18 illustrated in FIGS. 3A and 3B. Polystyrene material to be baled is moved upon the conveyor 18 into the loading area 16, and is baled in a baling chamber 20 integral to the baler 12.

The baler 12, shown in cutaway view, includes a large hydraulic cylinder 22, a ram 24 aligned in the baling chamber 20 and secured to the hydraulic cylinder 22, a plurality of channels 26a-26n lining portion 20a of the baling chamber 20, a plurality of retaining dogs 28a-28n in portion 20b of the baling chamber 20, a vertically operated bale door 30, a plurality of reinforcement bars 32a-32n about the bale door 30 and a baler framework 34. A control panel 36 mounts on the upper region of the baler framework 34.

The loading area 16 includes a hopper 38 aligned generally over the portion 20a of the baling chamber 20, a polystyrene breaker 40 secured over and above the hopper 38 and a three-sided guide chute 42 secured over and above the polystyrene breaker 40. The polystyrene breaker 40 is described later in detail. A box-like structure 48, extending from hopper 38 includes an inspection window 43 on an access door 44. A protective screen 46 aligns over the left end of the baler framework 34.

FIG. 2 illustrates the alignment of FIGS. 3A and 3B.

FIGS. 3A and 3B illustrate a side view of the polystyrene breaker 40 where all numerals correspond to those elements previously described. A rotary chopper 50, which is an integral part of the polystyrene breaker 40 aligns in the polystyrene breaker enclosure 52 and is described later in detail. Also illustrated is the conveyor 18 including a plurality of legs 54a-54n supporting a framework 56. The conveyor 18 includes a powered belt 58 which aligns about opposing axles 60 and 62. A safety shut off wire 64 extends along both sides of the conveyor 18 to stop the conveyor 18 if an undesirable operating condition exists. A light 66 signals operation of the polystyrene baler 10 to worn personnel of system activation. A loading station 67 is also included at one end of the conveyor 18.

Figure 4:
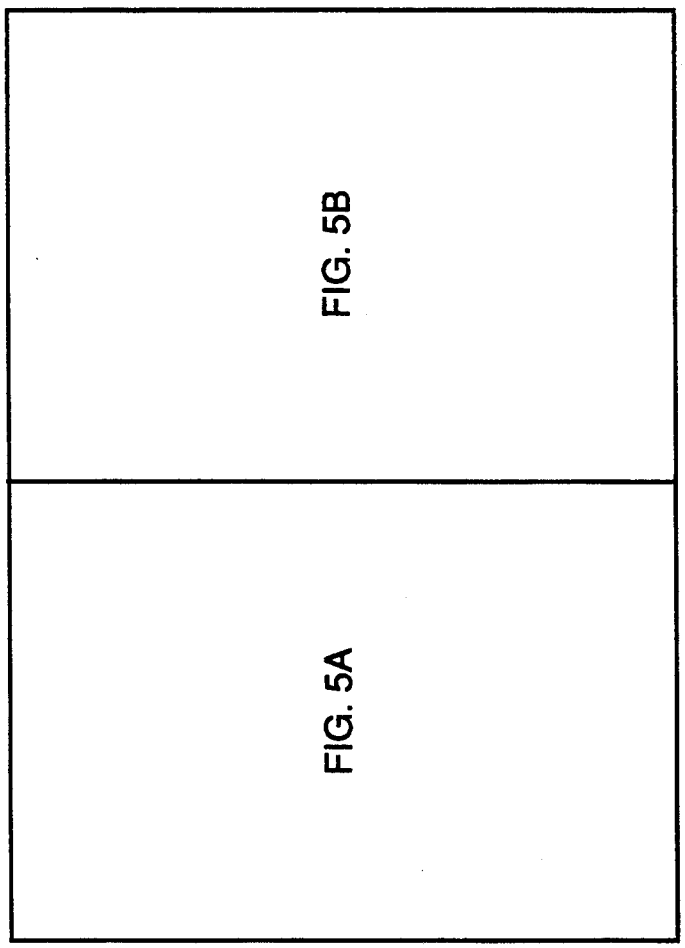
FIG. 4 illustrates the alignment of FIGS. 5A and 5B.
Figure 5A:
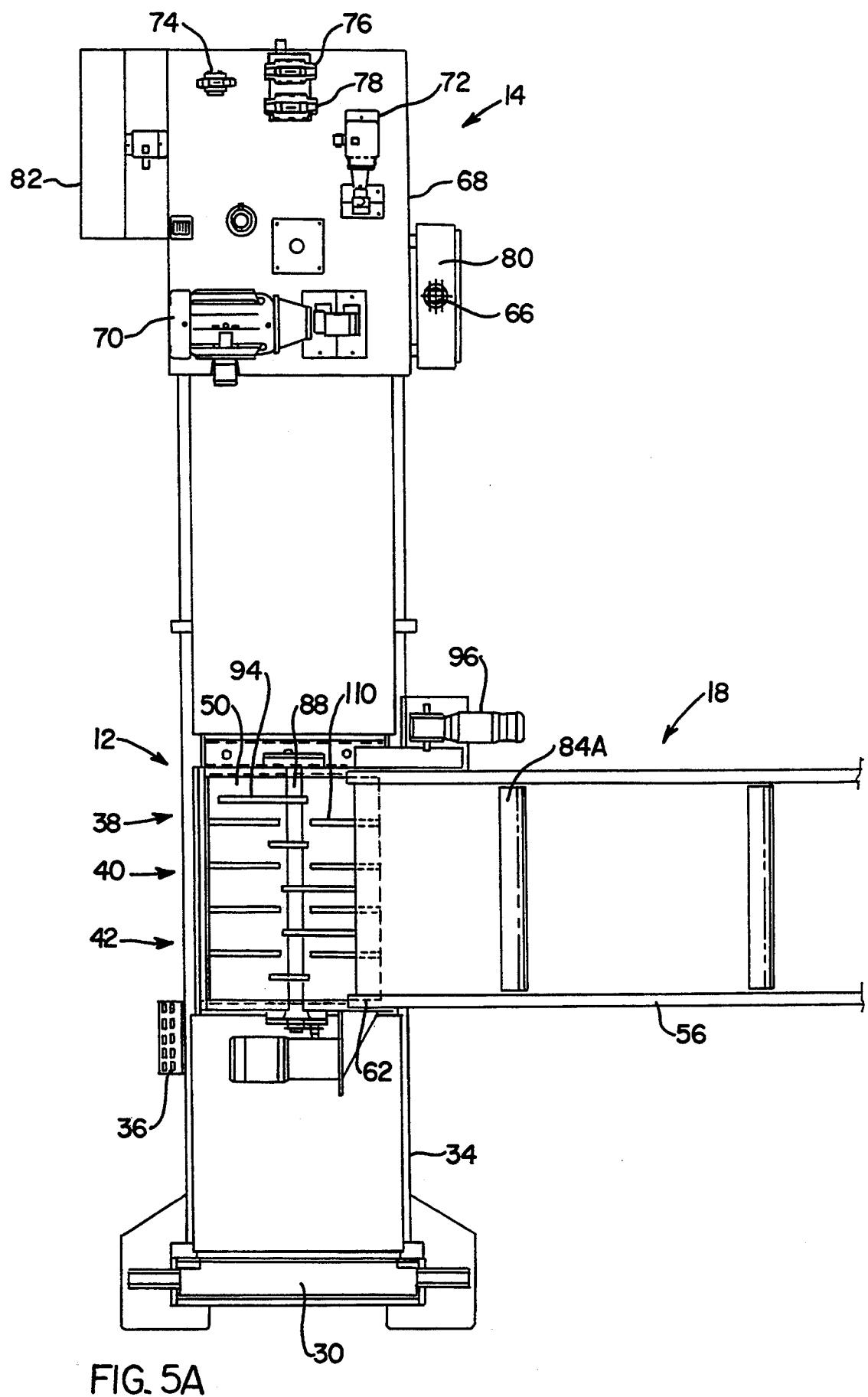
FIGS. 5A and 5B illustrate a top view of the polystyrene baler.
Figure 5B:
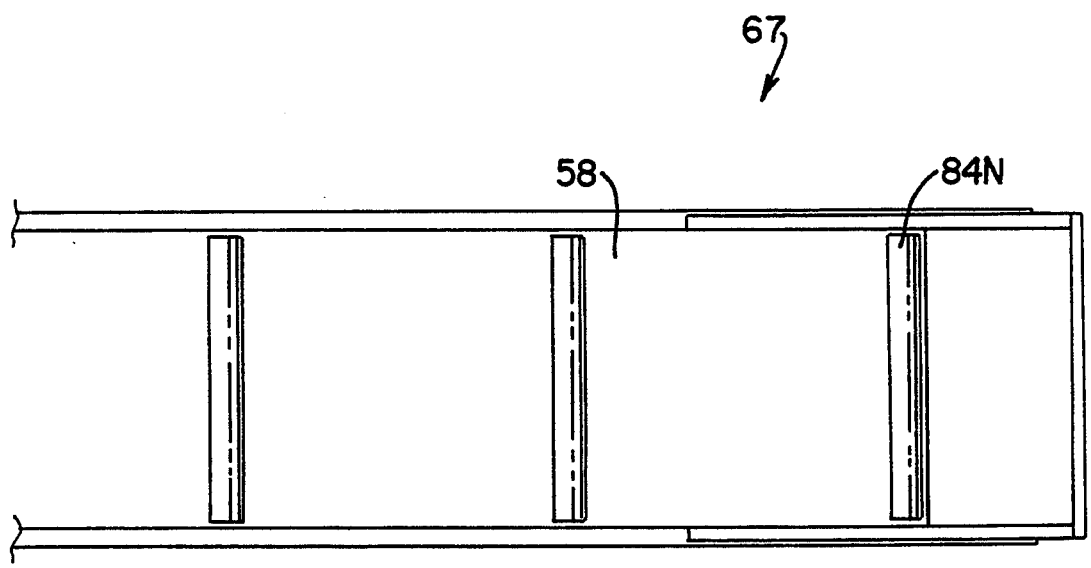

FIG. 4 illustrates the alignment of FIGS. 5A and 5B.

FIGS. 5A and 5B illustrate a top view of the polystyrene baler 10 where all numerals correspond to those elements previously described. For brevity and clarity of illustration, the box-like structure 48 including the access door 44 is not included. The hydraulic power unit 14 includes a hydraulic component mounting structure 68, hydraulic pumps 70 and 72, control valves 74, 76 and 78, and other assorted hydraulic devices. Also included are an electrical control panel 80 and an air-to-oil cooler 82. Also illustrated on the conveyor 18 are a plurality of cleats 84a-84n.

Figure 6:
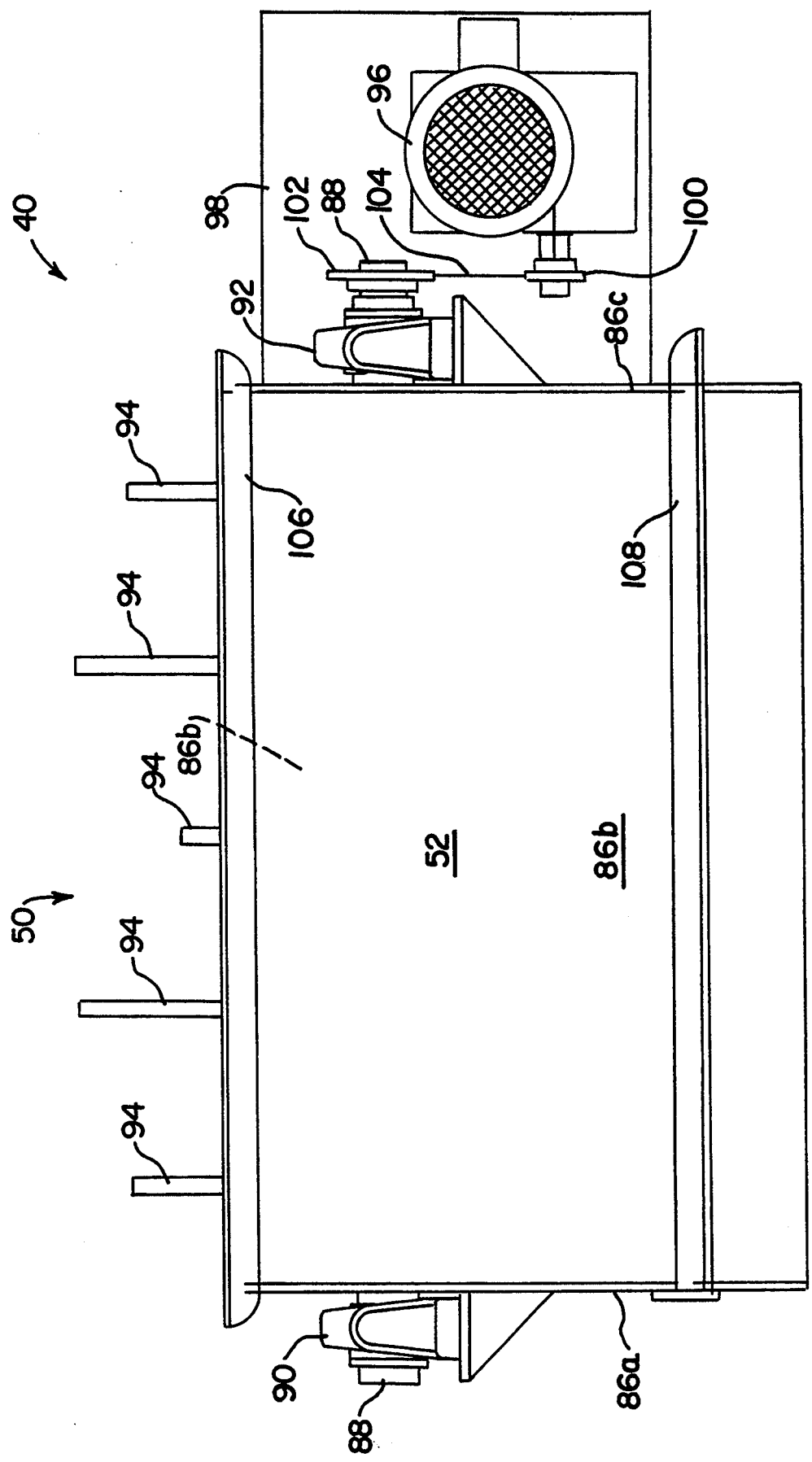
FIG. 6 illustrates a side view of the polystyrene breaker.
Figure 7:
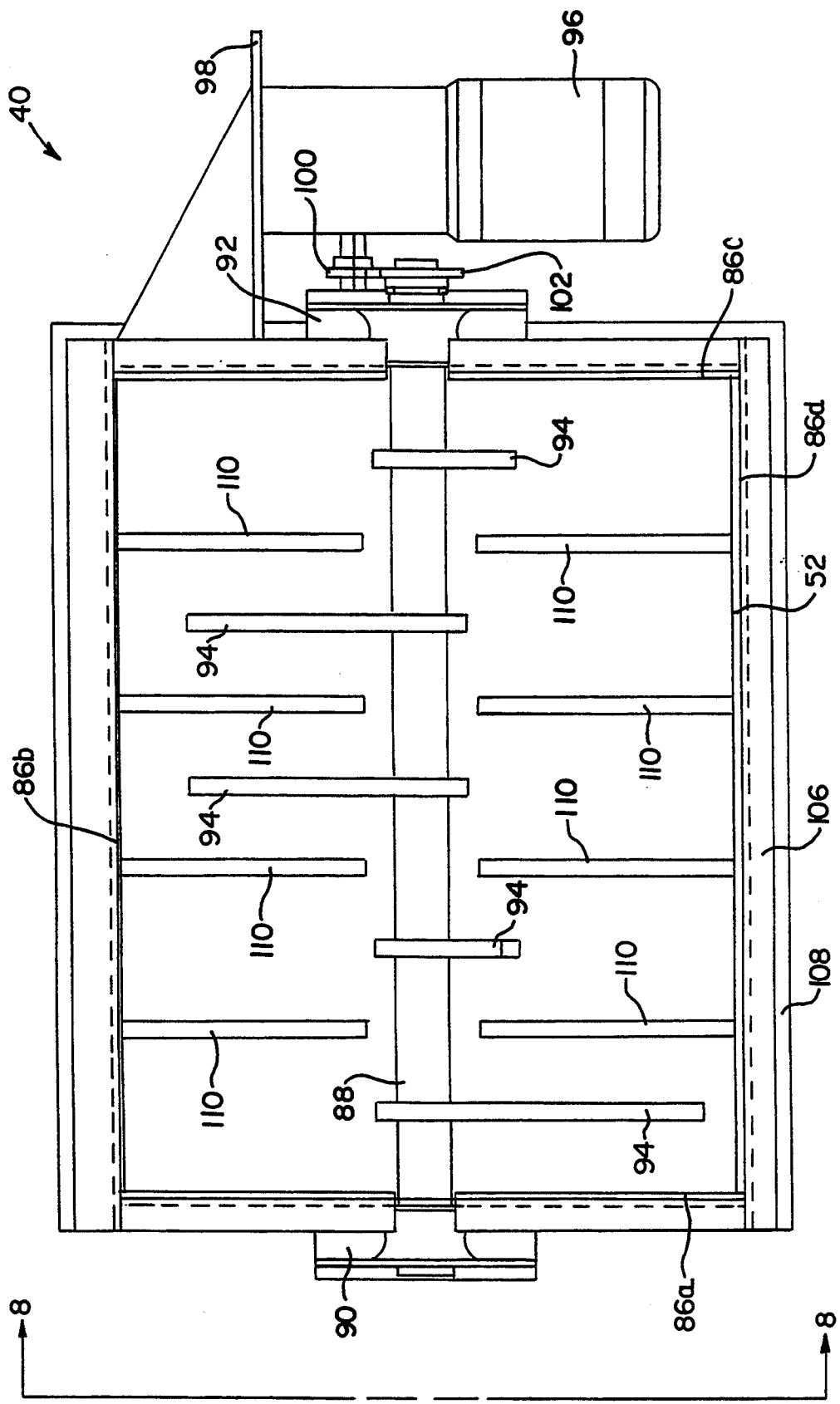
FIG. 7 illustrates a top view of the polystyrene breaker.
Figure 8:
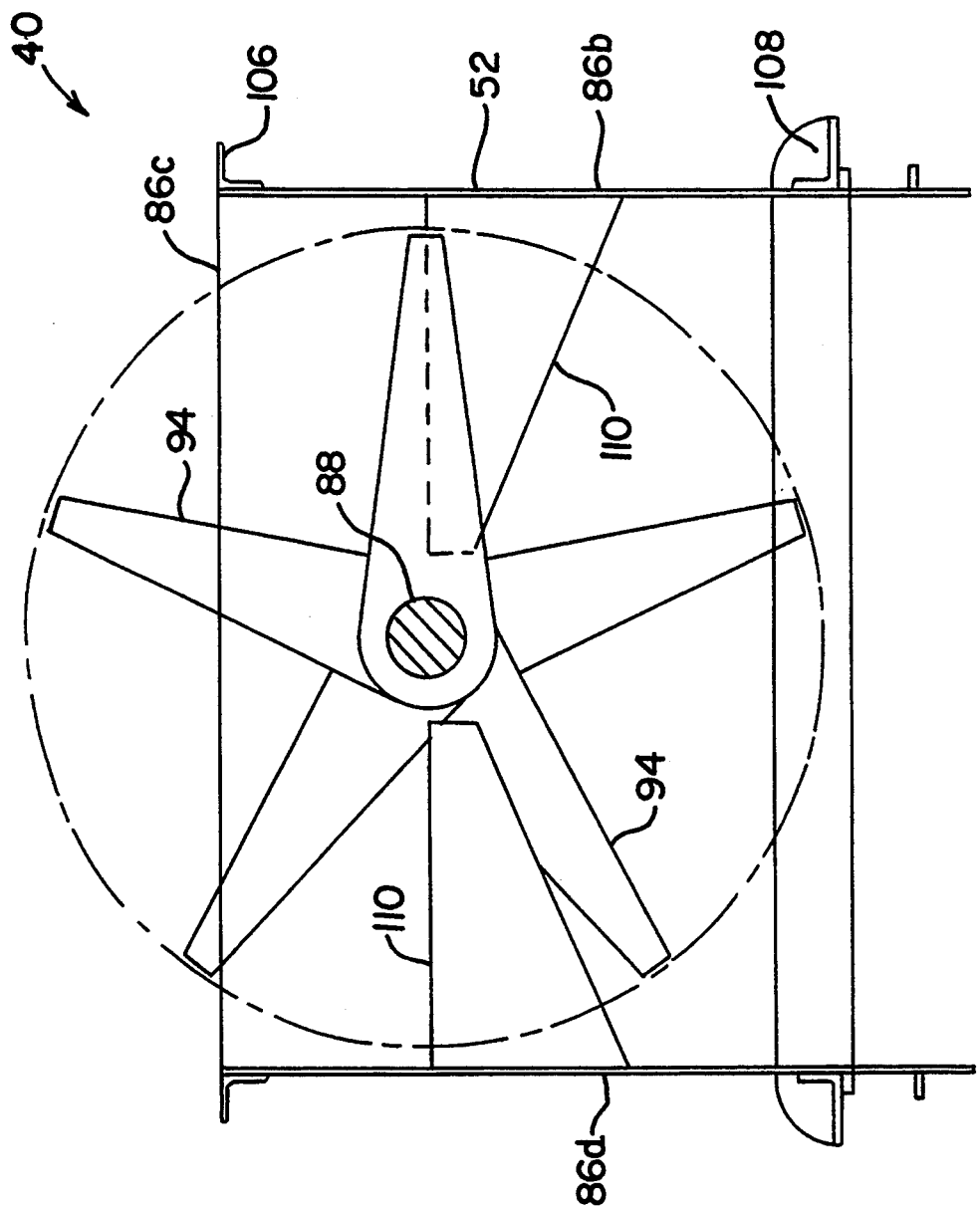
FIG. 8 illustrates an end view in cutaway of the polystyrene breaker along line 8—8 of FIG. 7.

FIG. 6 illustrates a side view of the polystyrene breaker 40 where all numerals correspond to those elements previously described. The polystyrene breaker enclosure 52 includes a plurality of vertical sides 86a-86c visible in this illustration and another side 86d opposing side 86b not illustrated. The rotary chopper 50 is partially enclosed in the polystyrene breaker enclosure 52 and includes a main shaft 88 rotationally secured to opposing bearings 90 and 92 on sides 86a and 86c of the polystyrene breaker enclosure 52. A plurality of like chopper arms 94 are offset from each other about the main shaft 88 as illustrated in FIGS. 7 and 8. A motor 96 secures to a mounting plate 98. A sprocket 100 on the motor 96 drives chain 104, and a sprocket 102 secures to the chopper main shaft 88. Upper and lower mounting flanges 106 and 108 surround the polystyrene breaker enclosure 52 to facilitate mounting to the corresponding flanges of the hopper 38 and the three-sided guide chute 42.

FIG. 7 illustrates a top view of the polystyrene breaker 40 where all numerals correspond to those elements previously described. Illustrated in particular is the intermeshing of the rotary chopper arms 94 with the like stationary chopping arms 110 extending from opposing sides 86b and 86d of the polystyrene breaker enclosure 52. Incoming polystyrene material is introduced into the top of the polystyrene breaker 40 and is broken up and crushed between the interleaved rotary chopper arms 94 and the stationary chopping arms 110 to be gravitationally deposited in the underlying hopper 38 and subsequently into the baling chamber 20 where it is compressed and baled.

FIG. 8 illustrates an end view in cutaway of the polystyrene breaker 40 along view line 8—8 of FIG. 7 where all numerals correspond to those elements previously described. Illustrated in particular are the angular displacement of the plurality of rotary chopper arms 94 which are spaced at 72° for purpose of illustration only and not to be construed as limiting of the scope of the invention, whereas any number of rotary chopper arms at either equal or staggered angular spacings may be incorporated to intermesh with any number of stationary chopping arms.

Figure 10A:
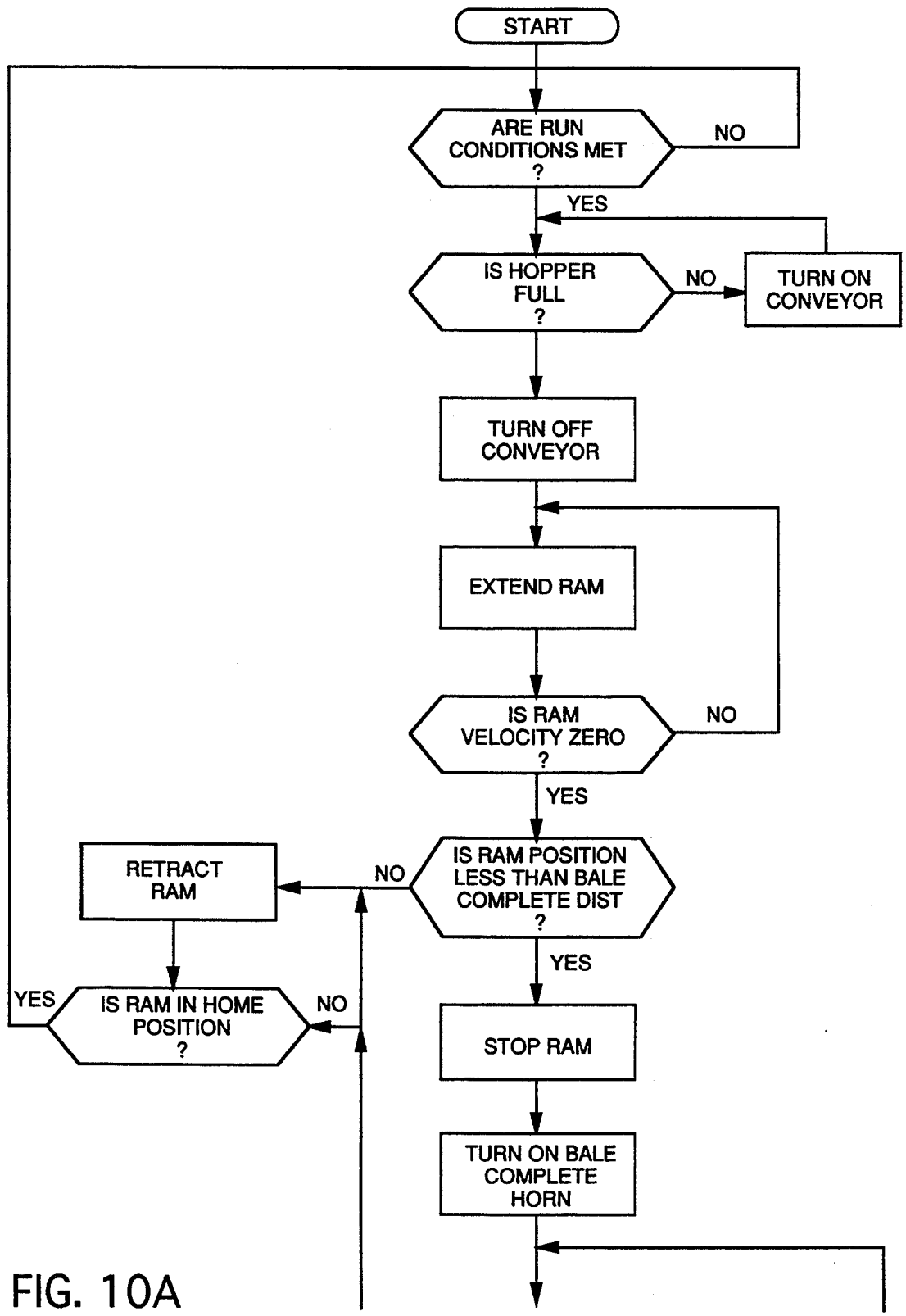
FIGS. 10A, 10B, and 10C illustrate a flow chart for electromechanical operation of the polystyrene baler.
Figure 10B:
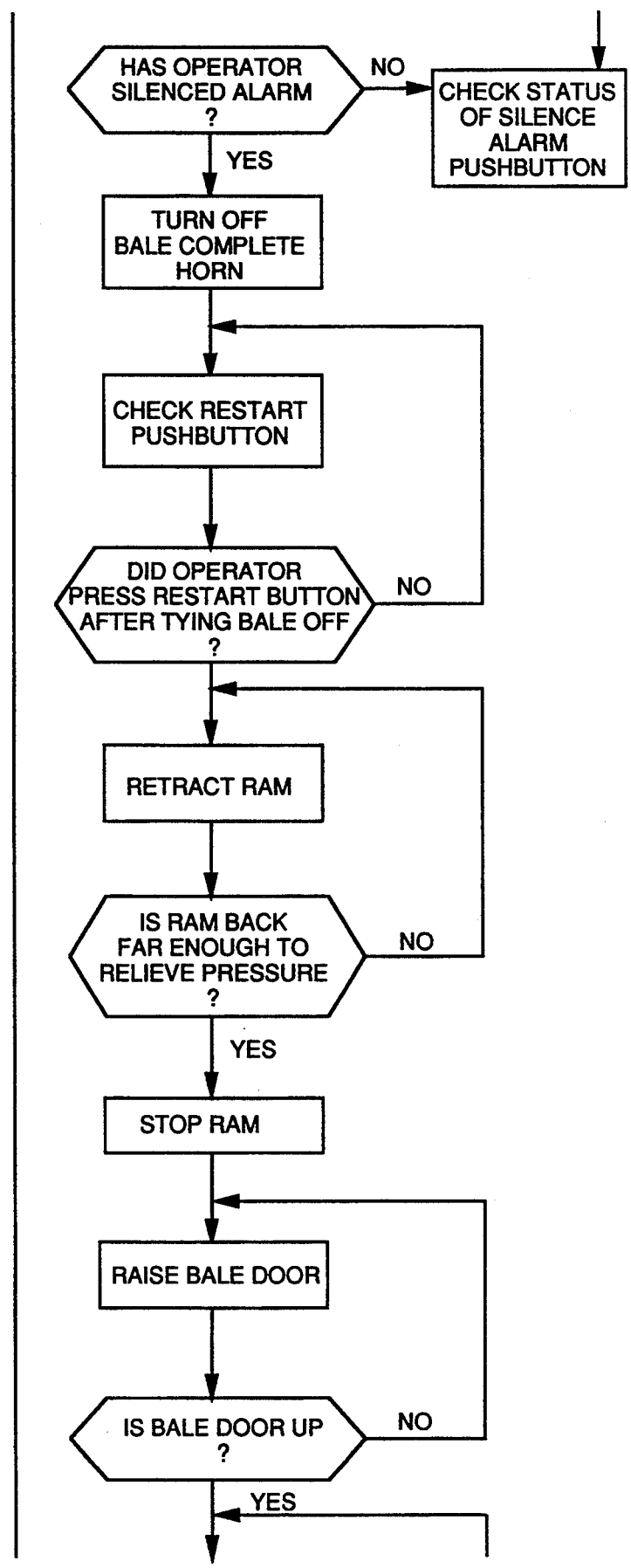
Figure 10C:
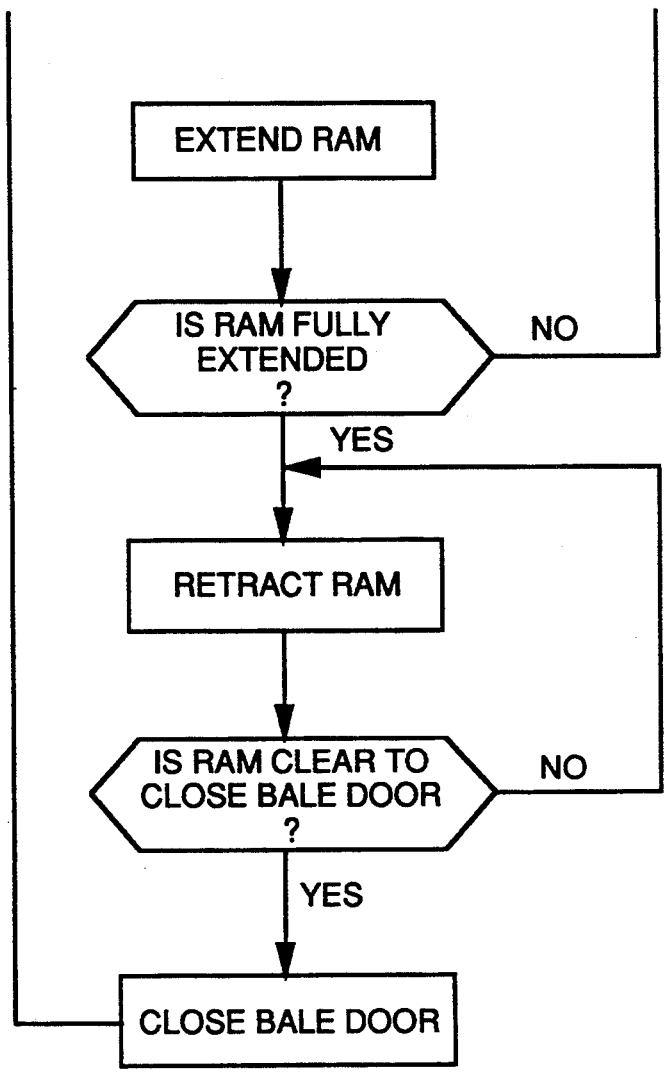
Figure 11A:
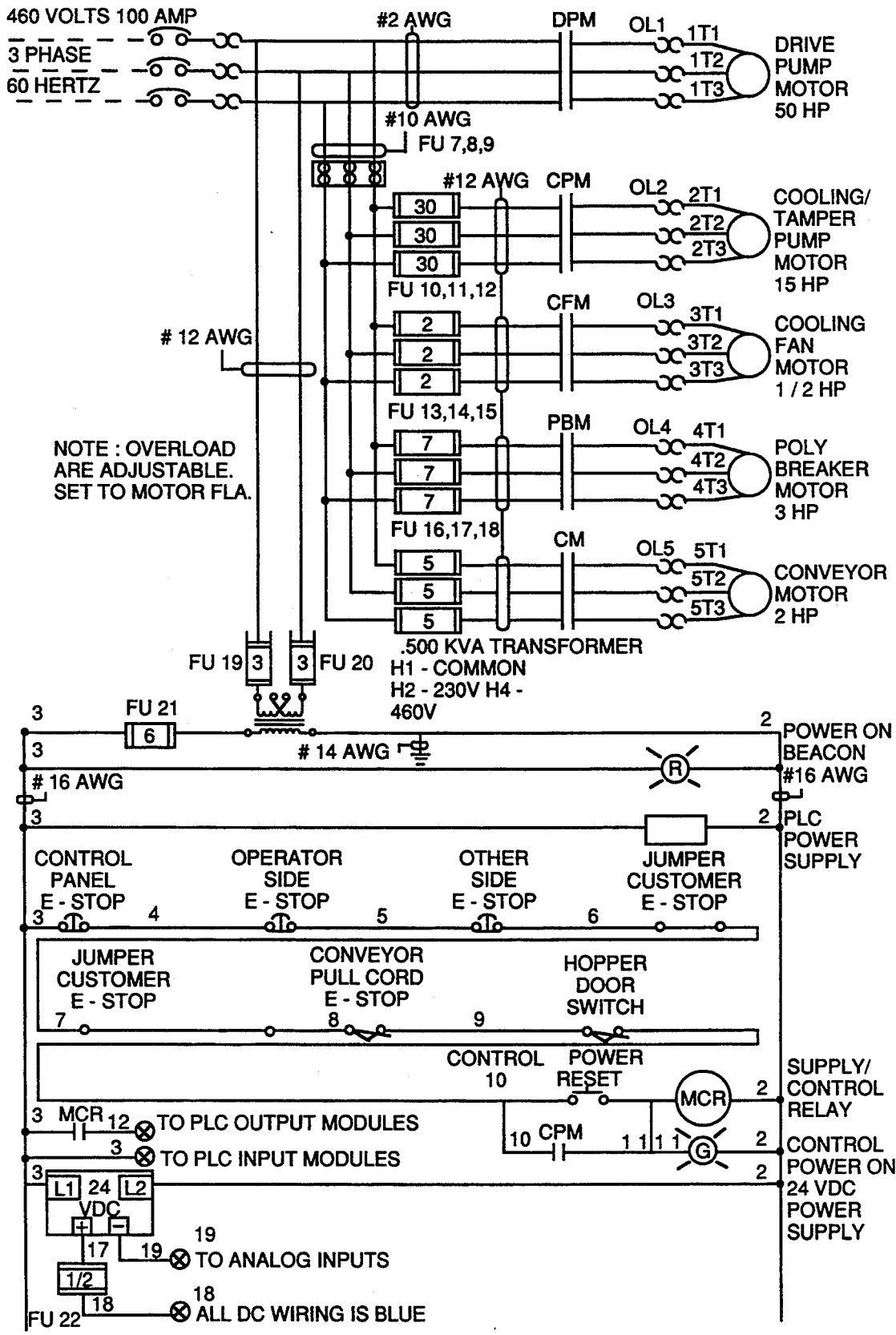
FIGS. 11A-11D illustrate the electromechanical circuit.
Figure 11B:
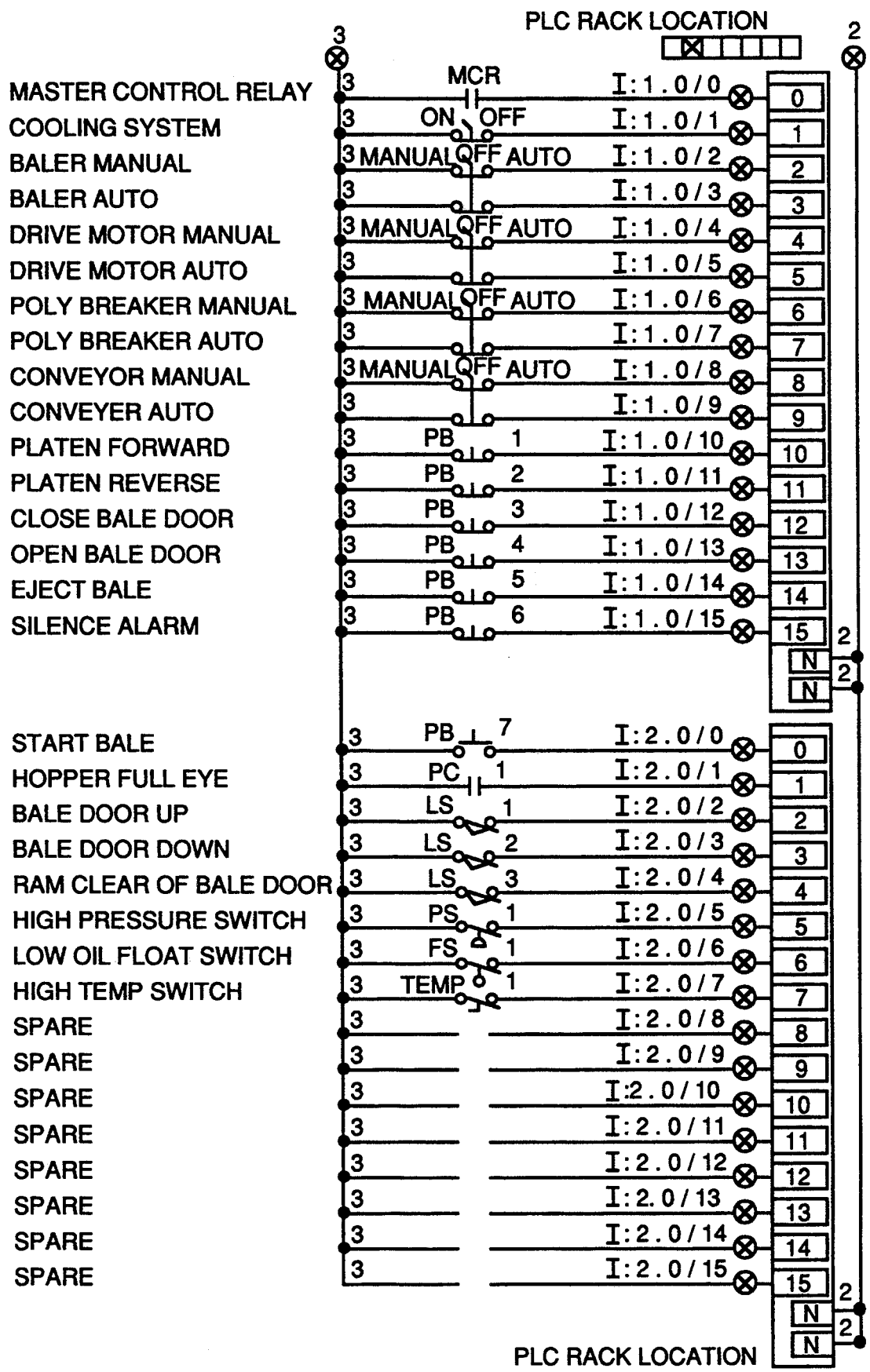
Figure 11C:
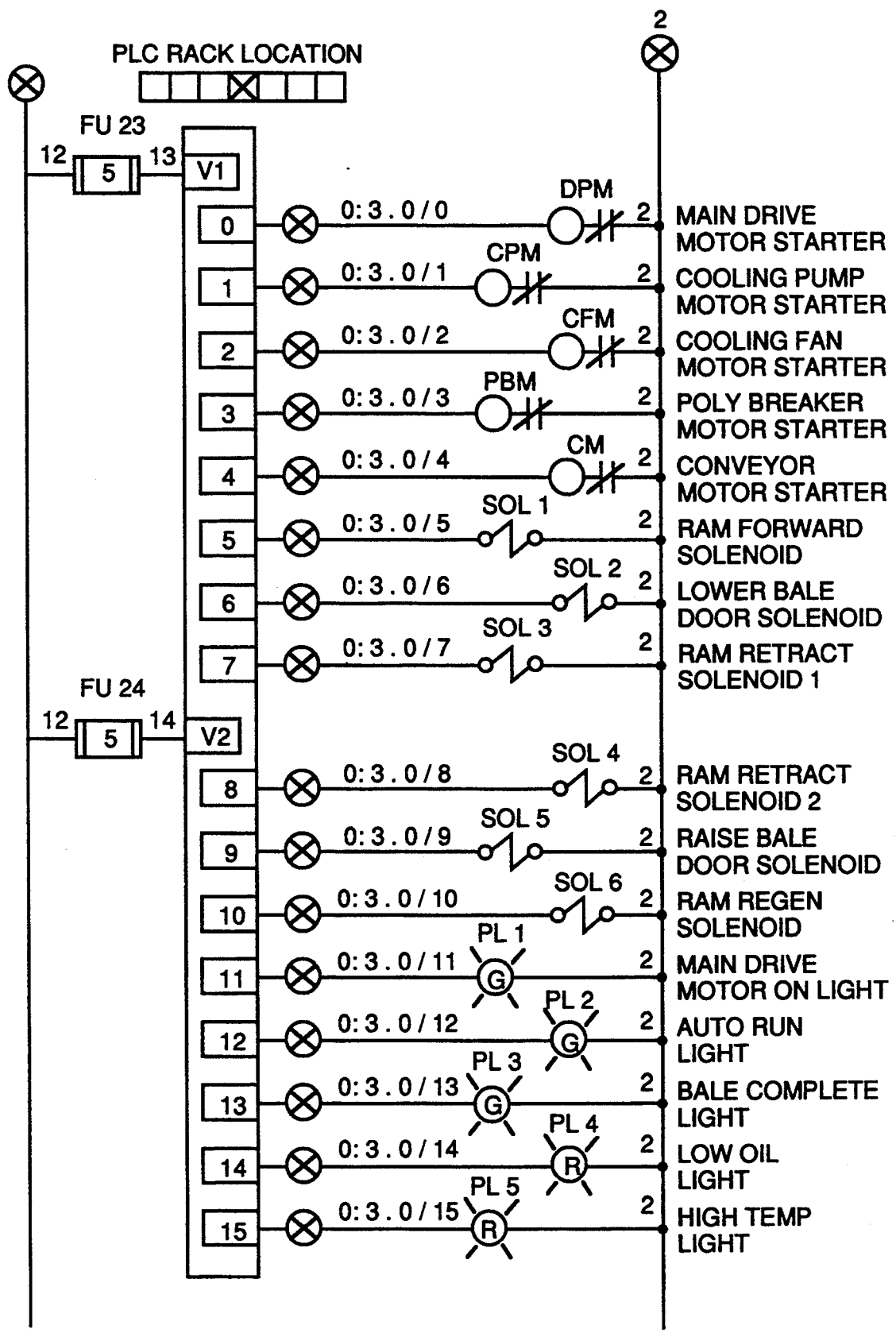
Figure 11D:
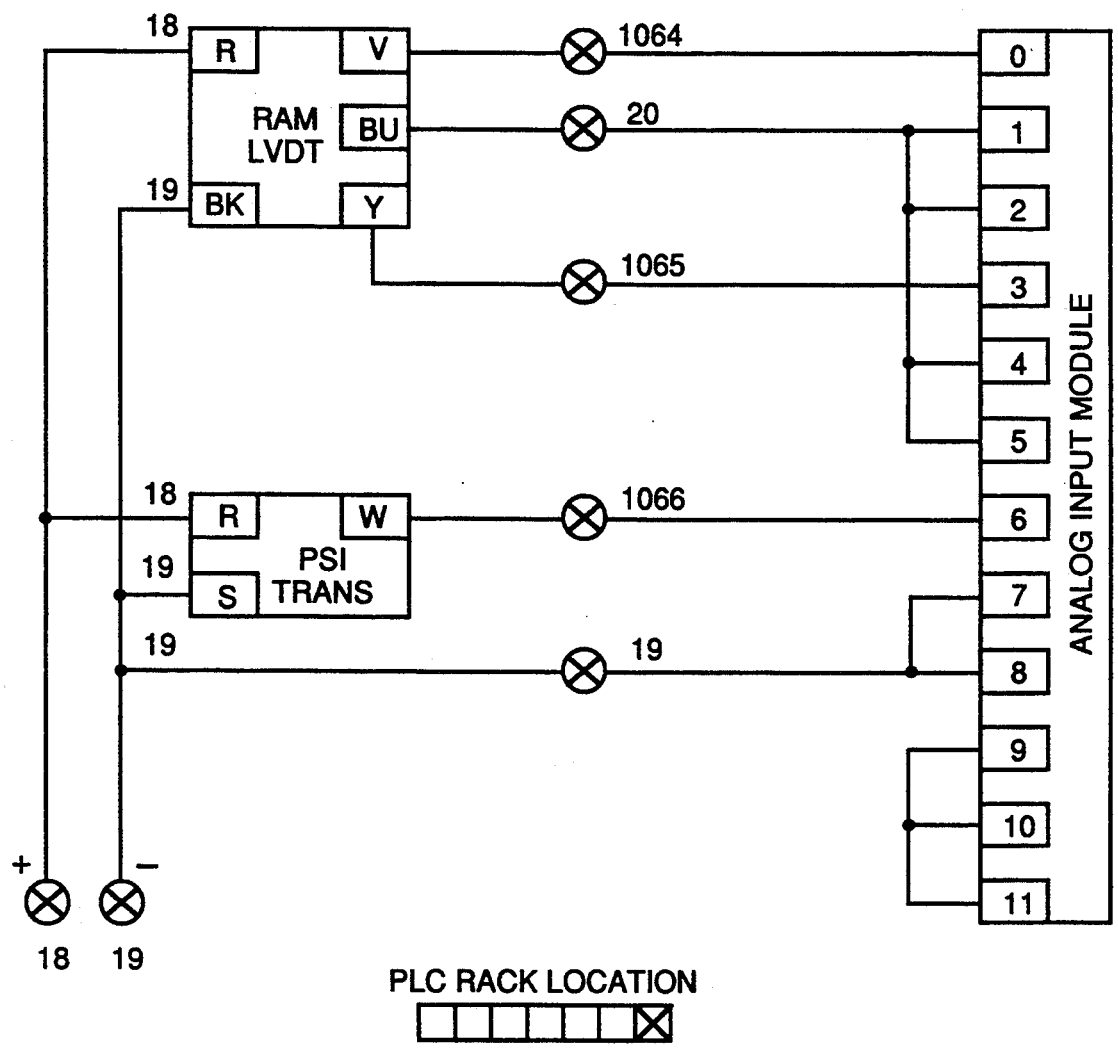
Figure 11E:
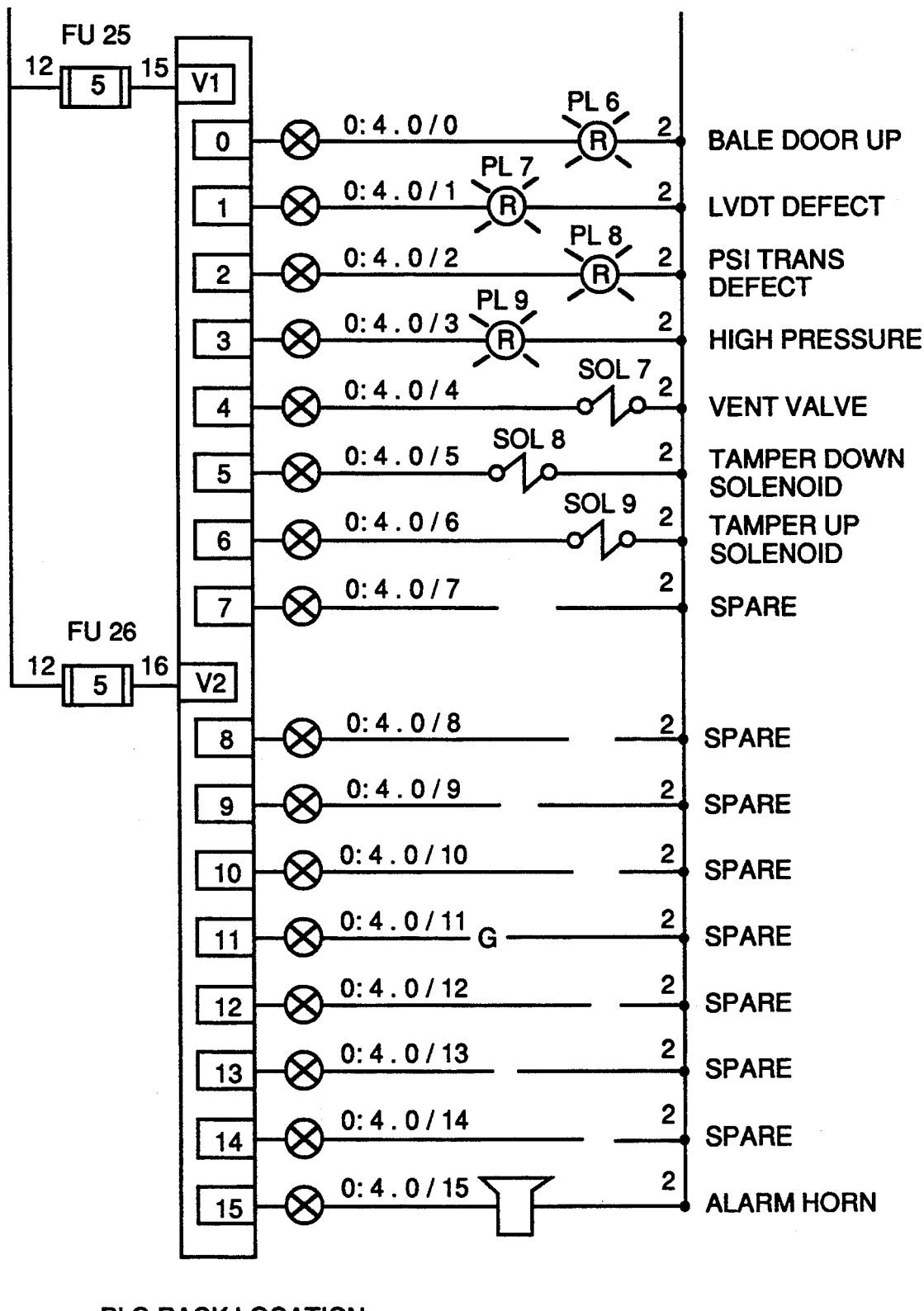
Figure 12A:
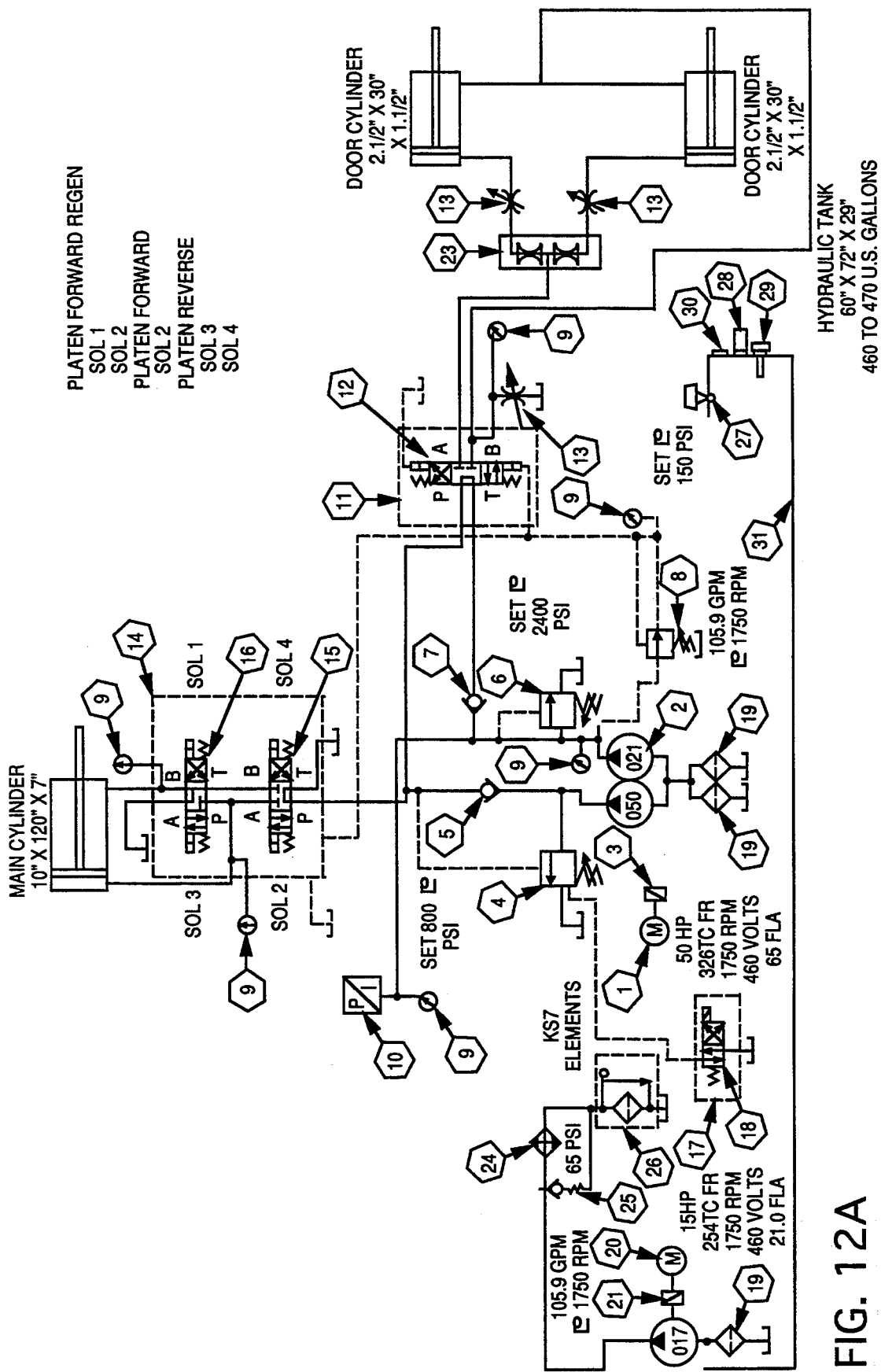
FIG. 12 illustrates the hydraulic circuit.

FIG. 9 illustrates the alignment of FIGS. 10A, 10B and 10C.

MODE OF OPERATION

FIGS. 10A, 10B and 10C illustrate a flow chart 200 for electromechanical operation of the polystyrene baler 10. Microfiche Appendix 1 is the software program listing for the programmable logic controller.

FIGS. 119, 11B, 11C, and 11D illustrate the electromechanical circuitry which is controlled by the software program of Appendix 1, which corresponds to the flow chart of FIGS. 10A–10C to control the hydraulic circuitry, as well as the electromechanical circuitry for the polystyrene baler. The baler electromechanical circuitry, as well as hydraulics, senses the hydraulic system pressure, as well as the length of travel of the ram through a magnetostrictive linear displacement transducer (MLDT), which connects between the back side of the ram face plate and the end of the hydraulic cylinder. This indicates the distance of travel of the ram, as well as the velocity of travel of the ram. The distance of the travel of the ram is important because this indicates when compression is achieved on each stroke of the polystyrene against the ejection door, as well as the completion of a bale which is a predetermined distance of travel, and when that predetermined distance of travel is reached.

The polystyrene is essentially laminated to itself and baling is based on the function of the compression of each of the individual cells forming the polystyrene material. To obtain compression, it is necessary to compress the polystyrene sufficiently to break each of the individual cells of the polystyrene into a compressed form. It is desirable to obtain a high density bale for purposes of transporting the bales in an optimal form, such as by filling a rail cart to the desired maximum weight or a trailer of a tractor trailer to the desired maximum weight for purposes of transporting the bales for recycling so as to be within the economies of recycling, especially with respect to the transportation costs. One preferred bale size by way of example and for purposes of illustration only and not to be construed as limiting of the present invention, is a bale of about 54" in length by 43" in width, by 30" in height, in a range of about 500 pounds, although the bale could have any weight between 400 to 800 pounds depending upon the density of the bale. Preferably, the bale would have a density of about 10–20 pounds per cubic foot of baled polystyrene material. This is obtained by ram face pressure of 100 to 500 pounds per square inch, preferably about 200 pounds per square inch. The material to obtain optimum baling is chopped to a size of about 10" to 20", and preferably of a size of about 12". The polystyrene usually is molded into much larger sizes, such as for packing material for appliances or manufacturing parts; and therefore, needs to be chopped prior to compression. There are also different grades of polystyrene, and the different grades will bale under pressure depending upon the response of the material to the ram face plate pressure. It may be necessary to hold the polystyrene under pressure, although this reduces the throughput of the baling. It is important to compress and take away at least 90% of the memory of the polystyrene, and to break the cells for intensification under compression, in what may be referred to as laminating.

Polystyrene, such as packing materials, boxes or beads, are dumped into the hopper, some of which may fall through or between the chopper legs of the polystyrene baler enclosure. The large chunks are reduced to pieces, having a maximum dimension of 12". The ram is repeatedly extended to compact the material, and the length of movement of the ram, and the pressure exerted by the ram are controlled through algorithms stored in a microprocessor in the electromechanical control circuitry. Once a bale is formed, the bale can be tied off which is optimal, the door is opened and the ram pushes the bale out the end of the baler and past the door.

The compression stroke is at maximum pressure to complete each baling cycle. The compression stroke at maximum pressure is repeated until the bale is complete, based upon the length of the bale, as well as the pressure of the hydraulic fluid in the hydraulic circuit for the ram.

Various modifications can be made to the present invention without departing from the apparent scope hereof.

We claim:

1. A baling system for baling rigid foam material having internal cells comprising:
   a. a bale chamber;
   b. a ram movable in a horizontal direction for compressing material in the bale chamber;
   c. means for repeatedly providing selected amounts of foam material to the baling chamber;
   d. means for compressing each of the repeatedly provided amounts of foam material and for collapsing the cells at a predetermined pressure;
   e. means for determining when sufficient material is in the baling chamber to comprise a finished bale; and,
   f. means for moving the ram to compress the finished bale to a density in the range of 10 to 20 pounds per cubic foot.

2. The system of claim 1 further comprising a chopper means affixed above the baling chamber for chopping foam material into pieces approximately 12 inches in maximum dimension.

* * * * *

UNITED STATES PATENT AND TRADEMARK OFFICE
CERTIFICATE OF CORRECTION

PATENT NO. : 5,363,758
DATED : November 15, 1994
INVENTOR(S) : Forrest Wildes, Wayne Maki and Chris A. Jefferson It is certified that error appears in the above-indentified patent and that said Letters Patent is hereby corrected as shown below:

Column 4, line 66, delete "119" and substitute therefor --11A--.

Signed and Sealed this

Fifteenth Day of August, 1995

Attest:

BRUCE LEHMAN

Attesting Officer     Commissioner of Patents and Trademarks